(12) United States Patent
Okada

(10) Patent No.: US 7,349,022 B2
(45) Date of Patent: Mar. 25, 2008

(54) IMAGE SHIFT CORRECTING DEVICE, IMAGE CAPTURING DEVICE, AND DIGITAL CAMERA USING SAME

(75) Inventor: Hiroyuki Okada, Izumi (JP)

(73) Assignee: Minolta Co., Ltd., Osaka (JP)

( * ) Notice: Subject to any disclaimer, the term of this patent is extended or adjusted under 35 U.S.C. 154(b) by 734 days.

(21) Appl. No.: 10/411,125

(22) Filed: Apr. 11, 2003

(65) Prior Publication Data

US 2003/0210343 A1 Nov. 13, 2003

(30) Foreign Application Priority Data

May 13, 2002 (JP) ............................... 2002-137585

(51) Int. Cl.
*H04N 5/228* (2006.01)
(52) U.S. Cl. .............. 348/345; 348/208.99; 348/208.2; 396/55
(58) Field of Classification Search ................. 348/208.99–208.16, 345; 396/421, 52–55
See application file for complete search history.

(56) References Cited

U.S. PATENT DOCUMENTS

| 5,615,397 | A | * | 3/1997 | Shiomi et al. ................. 396/55 |
| 5,761,546 | A | * | 6/1998 | Imada ........................... 396/55 |
| 6,130,716 | A | * | 10/2000 | Hirasawa ..................... 348/347 |
| 6,445,882 | B1 | | 9/2002 | Hirano |
| 6,510,283 | B1 | * | 1/2003 | Yamagishi .................... 396/55 |
| 6,816,188 | B1 | * | 11/2004 | Imai ........................ 348/208.2 |
| 6,985,177 | B2 | * | 1/2006 | Takahashi et al. ..... 348/208.99 |
| 2001/0033331 | A1 | * | 10/2001 | Eto et al. .................... 348/208 |
| 2002/0154241 | A1 | * | 10/2002 | Ohkawara ................... 348/345 |

FOREIGN PATENT DOCUMENTS

| JP | 5-48956 A | 2/1993 |
| JP | 08-171116 | 7/1996 |
| JP | 11-155094 A | 6/1999 |
| JP | 2001-194575 A | 7/2001 |
| JP | 2002-131799 A | 5/2002 |

* cited by examiner

*Primary Examiner*—Lin Ye
*Assistant Examiner*—Pritham D. Prabhakher
(74) *Attorney, Agent, or Firm*—McDermott Will & Emery LLP

(57) ABSTRACT

A image shift correcting device to prevent the user's erroneous recognition while ensuring the accuracy of the AF processing even when a hand shake occurs in the photographing preparation period, is provided with: a image capturing element for performing image capture; exposure controlling element for repeating an exposure for obtaining image data and non-exposure in a predetermined cycle in the image capturing element; image shift correcting element for correcting a shift of a subject image in the image capturing element; and controlling element for performing the correction by the image shift correcting element when the exposure for obtaining image data is performed.

10 Claims, 11 Drawing Sheets

(e') IMAGE SHIFT CORRECTING OPERATION OF LENS SYSTEM

CENTRAL POSITION (f) AMOUNT OF IMAGE SHIFT

IMAGE SHIFT CORRECTING DEVICE, IMAGE CAPTURING DEVICE, AND DIGITAL CAMERA USING SAME

This application is based on Japanese Patent Application No. Hei 2002-137585 filed in Japan on May 13, 2002, the entire content of which is hereby incorporated by reference.

FIELD OF THE INVENTION

The present invention relates to a image shift correcting device correcting a shift, due to a shake of hands holding the camera, of a light image of the subject projected onto the image capturing surface, an image capturing device, and a digital camera using same.

DESCRIPTION OF RELATED ART

Conventionally, various kinds of digital cameras and video cameras with a image shift correcting function have been proposed that have the function of correcting a shift of a light image of the subject projected onto the image capturing surface which shift is due to a shake of the user's hands holding the camera (hereinafter, referred to as "hand shake").

These kinds of cameras normally have a correcting lens system that makes the optical axis changeable and a sensor that detects the direction and the amount of shift of a light image of the subject on the image capturing surface based on a hand shake, and by canceling the shift of the light image of the subject on the image capturing surface by changing the optical axis of the taking lens system based on the direction and the amount of shift of the light image of the subject detected by the sensor, the position of projection of the light image of the subject projected onto the image capturing surface is fixed. This image shift correcting function is convenient because pictures with few blurs can be taken without the need for using a tripod or setting the camera in a stable position.

On the other hand, since cases are considered where photographing of a subject is performed by daring to use a hand shake, in recent years, electronic cameras with a image shift correcting function have been proposed in which a image shift non-correcting mode not using the image shift correcting function is selectable. These electronic cameras have a image shift correcting mode in which image shift correction is performed at the time of photographing and a image shift non-correcting mode in which image shift correction is not performed at the time of photographing, and when photographing is performed, either of these modes is selected in accordance with the photographic image to be obtained.

In the case of an electronic camera performing AF processing, for example, according to a contrast detection method in the period of photographing preparation processing (processing normally started by a half depression of the shutter button prior to actual photographing [photographing of images to be recorded]), when a hand shake occurs at the time of photographing of the subject, since high-frequency components of the image data disappear, the overall contrast of the image is lower than that when no hand shake occurs, so that there are cases where AF processing is not appropriately performed. Therefore, when electronic cameras of this kind are provided with the image shift correcting function as described above, it is desirable that image shift correction be performed also in the period of photographing preparation processing to appropriately perform AF processing.

However, when image shift correction is always performed in the photographing preparation period in the image shift non-correcting mode in a case where electronic cameras have both the image shift correcting mode and the image shift non-correcting mode, the following problem arises:

Generally, electronic cameras have an image display such as an LCD for monitoring display of images, and in the photographing preparation period, images captured at predetermined intervals to perform AF processing are displayed on the image display. When image shift correction is performed in the photographing preparation period in the image shift non-correcting mode, certain images (shift-corrected images) are always displayed on the image display. Therefore, when visually confirming the image displayed on the image display, the user can erroneously think that the image shift non-correcting mode is not selected but the image shift correcting mode is selected although the image shift non-correcting mode is selected in actuality, or can erroneously recognize that no hand shake occurs (or the hand shake is slight) although recognizing that the image shift- non-correcting mode is selected.

SUMMARY OF THE INVENTION

An object of the present invention is to prevent the user's erroneous recognition while ensuring the accuracy of the AF processing even when a hand shake occurs in the photographing preparation period in the image shift non-correcting mode in a image shift correcting device having two modes, the image shift correcting mode and the image shift non-correcting mode, an image capturing device and a digital camera using same.

The above-mentioned object is attained by providing a image shift correcting device, an image capturing device and a digital camera using same having the following structure:

An image capturing device of the present invention comprises: image capturing element for performing image capture; a taking lens system directing a subject image to the image capturing element; exposure controlling element for performing an exposure for obtaining image data for focusing and an exposure for obtaining image data for recording in the image capturing element; focusing element for performing focusing of the taking lens system based on the image data for focusing; image shift correcting element for correcting a shift of a subject image in the image capturing element; and controlling element for performing the correction by the image shift correcting element only when the exposure for obtaining image data for focusing is performed.

As described above, according to the present embodiment, since image shift correction is performed only in the exposure operation in the photographing preparation period, during the exposure operation, the position of projection of the light image of the subject onto the image capturing surface of the image capturing element is fixed and appropriate focusing can be performed, whereas in the period in which the exposure operation by the image capturing element is not performed, the position of projection of the light image of the subject onto the image capturing surface of the image capturing element is changed by a hand shake and the images captured by the exposure in the exposure periods, by extension the images successively displayed on the displaying element are shifted from each other, so that the user can recognize the occurrence of a hand shake.

In the above-described structure, it is in a photographing preparation period that the correction by the image shift correcting element is performed by the controlling element.

In the above-described structure, the image capturing device further comprises: first instructing element for providing an instruction to start focusing; and second instructing element for providing an instruction to start photographing for recording after the provision of the instruction from the first instructing element, and the photographing preparation period is from the provision of the instruction from the first instructing element to the provision of the instruction from the second instructing element.

In the above-described structure, the image capturing device further comprises: setting element for setting whether to perform image shift correction or not in image capture for recording, and the controlling element performs image shift correction both in the exposure for obtaining image data for focusing and in the exposure for obtaining image data for recording when it is set that image shift correction is performed, and performs image shift correction only in the exposure for obtaining image data for focusing when it is set that image shift correction is not performed.

In the above-described structure, the image shift correcting element optically corrects a shift of a light image of the subject in the image capturing element, and the controlling element optically returns the image shift correcting element to a non-correction position except for the exposure for obtaining image data for focusing.

In the above-described structure, the controlling element allows the correction operation by the image shift correcting element to be performed until the focusing operation by the focusing element is completed.

In the above-described structure, the image shift correcting element optically corrects a shift of a light image of the subject in the image capturing element, and the controlling element optically stops the image shift correcting element at the end of the exposure for obtaining image data for focusing.

Moreover, a image shift correcting device of the present invention comprises: image capturing element for performing image capture; exposure controlling element for repeating an exposure for obtaining image data and non-exposure in a predetermined cycle in the image capturing element; image shift correcting element for correcting a shift of a subject image in the image capturing element; and controlling element for performing the correction by the image shift correcting element when the exposure for obtaining image data is performed.

In the above-described structure, the image shift correcting device further comprises: a taking lens system directing the subject image to the image capturing element; and focusing element for performing focusing of the taking lens system based on the image data.

In the above-described structure, the image shift correcting element optically corrects a shift of a light image of the subject in the image capturing element, and the controlling element optically returns the image shift correcting element to a non-correction position in the non-exposure.

In the above-described structure, the image shift correcting element optically corrects a shift of a light image of the subject in the image capturing element, and the controlling element optically stops the image shift correcting element at the end of the exposure for obtaining image data.

Moreover, an electric camera of the present invention projecting an image of a subject onto an image capturing surface of image capturing element through a taking lens system capable of focusing, and capturing the image comprises: displaying element for performing monitoring display of captured image data; focusing element for focusing the taking lens system based on image data of the subject captured by the image capturing element by an exposure operation repeated in a predetermined cycle during a photographing preparation period; image shift correcting element for optically correcting a shift, due to a hand shake, of a light image of the subject projected onto the image capturing surface; and controlling element for allowing the correction operation by the image shift correcting element only in the exposure operation in the photographing preparation period.

In the above-described structure, the controlling element optically returns the image shift correcting element to a non-correction position between the periodic exposure operations in the photographing preparation period.

In the above-described structure, the controlling element allows the correction operation by the-image- shift correcting element to be performed until the focusing operation by the focusing element is completed.

In the above-described structure, the image capturing device further comprises mode switching element for selectively switching between a image shift correcting mode in which image shift correction is performed at the time of photographing and a image shift non-correcting mode in which image shift correction is inhibited at the time of photographing, and the controlling element allows image shift correction to be performed in the photographing preparation period and at the time of photographing when the image shift correcting mode is selected, and allows image shift correction to be performed only in the photographing preparation period when the image shift non-correcting mode is selected.

In the above-described structure, the image capturing device further comprises: first instructing element for providing an instruction to start focusing; and second instructing element for providing an instruction to start photographing after the provision of the instruction from the first instructing element, and the photographing preparation period is from the provision of the instruction from the first instructing element to the provision of the instruction from the second instructing element.

BRIEF DESCRIPTION OF THE DRAWINGS

This and other objects and features of this invention will become clear from the following description taken in conjunction with the preferred embodiments thereof with reference to the accompanied drawings, in which.

DETAILED DESCRIPTION OF THE PREFERRED EMBODIMENTS

Hereinafter, an embodiment of the electronic camera according to the present invention will be described.

Figure 1:
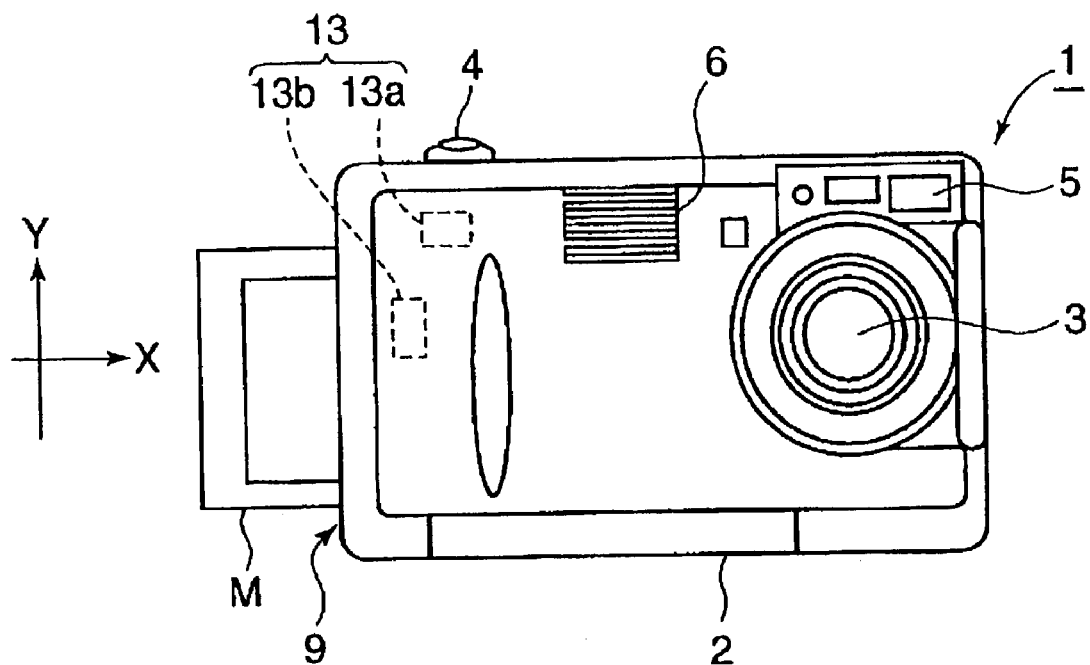
FIG. 1 is a front view. of an electronic camera according to the present invention.
Figure 2:
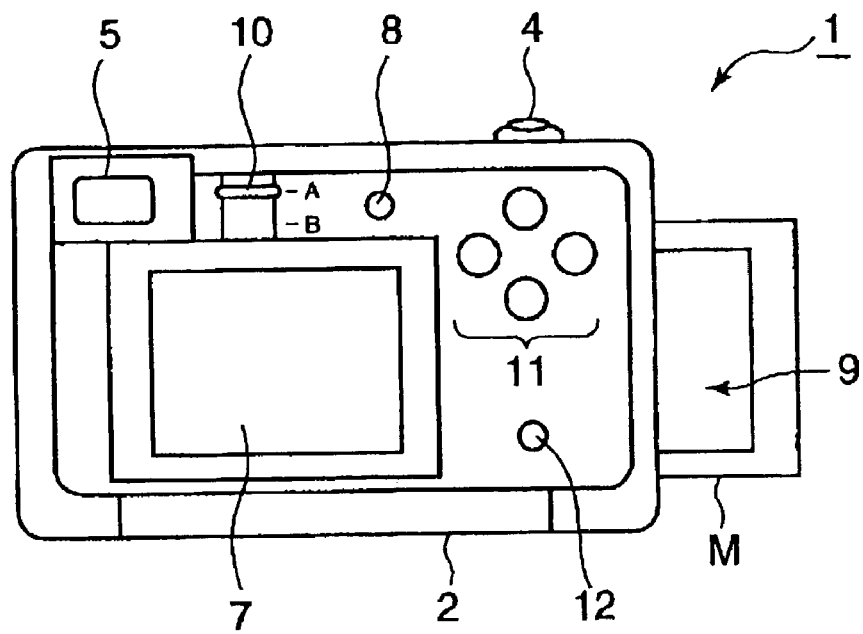
FIG. 2 is a rear view of the electronic camera.

FIG. 1 is a front view of an electronic camera 1. FIG. 2 is a rear view of the electronic camera 1.

As shown in FIGS. 1 and 2, the electronic camera 1 has the following on its camera body 2: a lens unit 3; a shutter button 4; an optical viewfinder 5; a flash 6; an LCD (liquid crystal display) 7; a power button 8; a card slot 9; a mode setting switch 10; function switches 11; a image shift correction ON/OFF button 12; and a image shift detecting sensor 13.

The lens unit 3 is disposed on the right side of the front of the camera body 2, and captures light images of the subject. The lens unit 3 has a taking lens system comprising a zoom lens system 3a and a focusing lens system 3b (see FIG. 5), and changes the focal length and adjusts the focus position by driving a lens driver 26 (see FIG. 5). The lens unit 3 also has, as described later, image shift correcting lens systems 15 and 16 for correcting a shift, due to a hand shake, of a light image of the subject projected onto the image capturing surface (see FIGS. 3 and 5).

The shutter button 4 is disposed at the left end of the top of the camera body 2 when viewed from the front. When the shutter button 4 is half depressed in a photographing mode (S1ON), photographing preparation processing (mainly the subject brightness is detected to set the exposure value, and the distance to the subject is detected to perform focusing of the lens unit 3). When the shutter button 4 is fully depressed (S2ON), photographing processing is performed at the set exposure value. The half depression of the shutter button 4 is detected by a non-illustrated switch S1. The full depression of the shutter button 4 is detected by a non-illustrated switch S2.

The optical viewfinder 5 is disposed in an upper left side of the rear of the camera body 2, and optically displays a light image of the subject by directing part of a luminous flux having passed through the taking lens system and separated and directed by non-illustrated separating means and light directing means, to the finder window through a non-illustrated lens. With this, the user visually confirms the photographic angle of view when looking through the optical viewfinder 5.

The flash 6 is disposed in an upper central part of the front of the camera body 2, and emits illumination light by causing an electric discharge in a non-illustrated discharge tube when the subject is dark.

The LCD 7 is disposed substantially in the center of the rear of the camera body 2, and performs monitoring display of taken images and playback display of recorded images. The LCD 7 also functions as an electronic viewfinder. Details thereof will be given later.

The power button 8 is disposed above the LCD 7 on the rear of the camera body 2, and alternately switches between ON and OFF of the main power supply every time it is depressed.

The card slot 9 is disposed on the left side of the camera body 2 when viewed from the front, and a memory card M comprising a plurality of semiconductor memory elements is inserted therein. The memory card M can be extracted by a non-illustrated extraction button provided in the vicinity of the card slot 9.

The mode setting switch 10 is a two-position switch disposed in an appropriate position of the LCD 7. When the mode setting switch 10 is set in the A position, the electronic camera 1 is set in the photographing mode for performing photographing of the subject. When the mode setting switch 10 is set in the B position, the electronic camera 1 is set in a playback mode for playing back taken images recorded on the memory card M, on the LCD 7.

The function switches 11 are for setting photographing conditions (e.g. the aperture value, the shutter speed, the presence or absence of the firing of a flash).

The image shift correction ON/OFF button 12 is for alternatively selecting a image shift correcting mode in which image shift correction by a image shift correcting mechanism described later is performed when photographing is performed, and a image shift non-correcting mode in which no image shift correction is performed. In the present embodiment, the image shift correcting mode is initially set in response to the setting of the photographing mode.

In the image shift correcting mode, image shift correction is performed in the period of the above-described photographing preparation processing performed by a half depression of the shutter button 4 and in the period of the photographing processing performed by a full depression of the shutter button 4. In the image shift non-correcting mode, although image shift correction is not performed in the period of the photographing preparation processing except the period of automatic focusing processing and in the period of the above-described photographing processing, image shift correction is performed in the period of the automatic focusing processing to accurately perform AF processing as a photographing preparation.

The image shift detecting sensor 13 comprises, assuming an X axis in the direction of FIG. 1 and a Y axis in a direction vertical to the X axis, an X sensor 13a detecting hand shakes in the direction of the X axis and a Y sensor 13b detecting hand shakes in the direction of the Y axis. The X sensor 13a and the Y sensor 13b each comprise a gyro using, for example, a piezoelectric element, and detect the angular velocities of shakes in the directions.

Next, the structure of the image shift correcting mechanism will be described.

Figure 3:
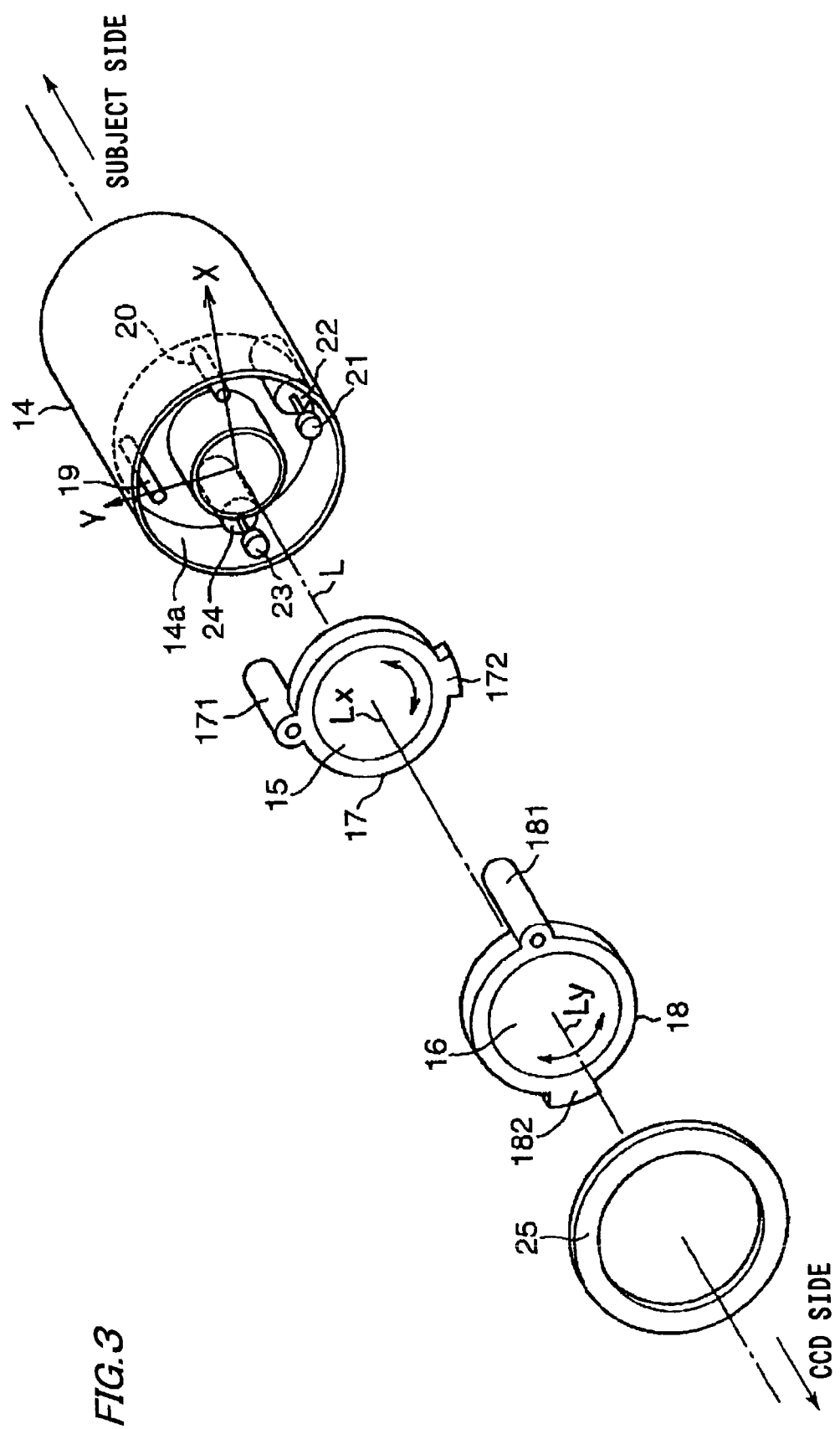
FIG. 3 is a perspective view of a image shift correcting mechanism.

FIG. 3 is an exploded perspective view showing the structure of an optical system for image shift correction. The optical system for image shift correction is provided on the side of a CCD 27 (see FIG. 5) of the lens unit 3. An annular concave portion 14a is provided at the rear end of a lens holder 14 of the taking lens system. In the concave portion 14a, an X-direction image shift correcting lens system 15 and a Y-direction image shift correcting lens system 16 are provided so as to be movable in the direction of the X axis (the lateral direction of the camera body 2) and in the direction of the Y axis (the longitudinal direction of the camera body 2), respectively, within a plane perpendicular to the optical axis L.

The X-direction image shift correcting lens system 15 is held by an annular holding frame 17 having on its edge a cylindrical pin hole 171 and a tooth 172 opposed to each other. The Y-direction image shift correcting lens system 16 is held by a holding frame 18 having the same structure as the holding frame 17.

In the concave portion 14a, as shown in FIG. 3, assuming X and Y coordinates with the optical axis L as the origin, a pin 19 is provided in an appropriate position on the positive part of the Y axis in the concave portion 14a. The pin 19 is fitted in the pin hole 171 of the holding frame 17 with play therebetween so that the X-direction image shift correcting lens system 15 can be displaced in the direction of the X axis in the concave portion 14a. Moreover, a pin 20 is provided in an appropriate position on the positive part of the X axis in the concave portion 14a. The pin 20 is fitted in a pin hole 181 of the holding frame 18 with play therebetween so that the Y-direction image shift correcting lens system 16 can be displaced in the direction of the Y axis in the concave portion 14a.

In the lens holder 14, a motor 22 from which a driving gear 21 fixed to a driving shaft protrudes is provided in an appropriate position on the negative part of the Y axis in the concave portion 14a. The driving gear 21 meshes with the tooth 172 of the holding frame 17. Moreover, a motor 24 from which a driving gear 23 fixed to a driving shaft protrudes is provided in an appropriate position on the negative part of the X axis in the concave portion 14a. The driving gear 23 meshes with a tooth 182 of the holding frame 18.

The image shift correcting lens systems 15 and 16 are attached with the lens system 15 inside so as to be able to be displaced in the X direction and the Y direction, respectively, in the concave portion 14a, and are secured by a pressing ring 25 so as not to jut out from the concave portion 14a.

In the above-described structure, when the motor 22 is rotated in the forward or the reverse direction, the image shift correcting lens system 15 is rotated a very small angle clockwise or counterclockwise about the pin 19 and this displaces the optical axis Lx of the image shift correcting lens system 15 in the positive or the negative X direction on the X axis with respect to the optical axis L, thereby performing image shift correction in the X direction.

Likewise, when the motor 24 is rotated in the forward or the reverse direction, the image shift correcting lens system 16 is rotated a very small angle clockwise or counterclockwise about the pin 20 and this displaces the optical axis Ly of the image shift correcting lens system 16 in the positive or the negative Y direction on the Y axis with respect to the optical axis L, thereby performing image shift correction in the Y direction.

FIGS. 4(a) to 4(e) are views of assistance in explaining a relationship among a subject O, the positions of the taking lens system and the image shift correcting lens system 15 (or 16) and the position of projection of the light image of the subject projected onto the image capturing surface of the CCD 27. In these figures, the taking lens system is illustrated as a single lens for convenience of explanation.

Figure 4:
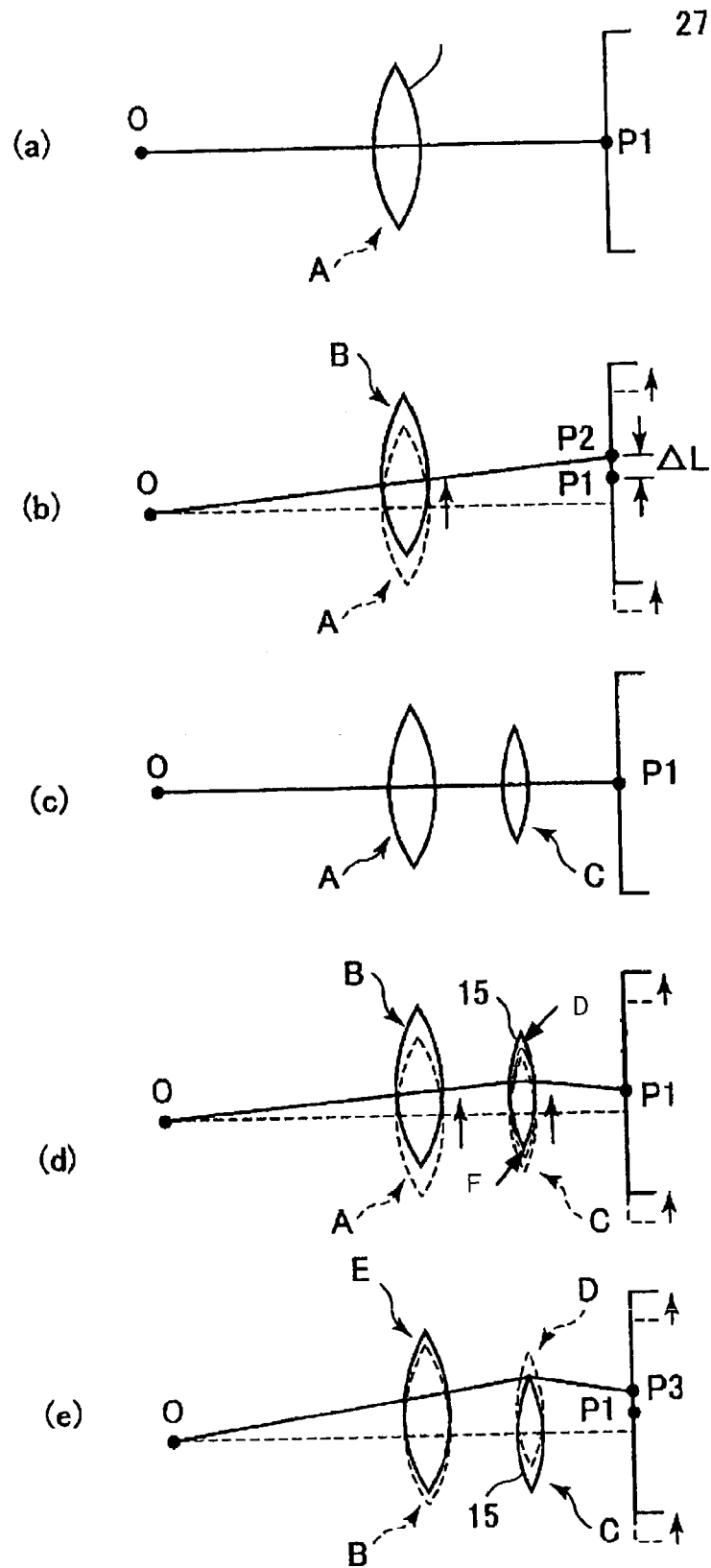
FIGS. 4(a) to 4(e) are views of assistance in explaining a relationship among a subject, the positions of a taking lens system and a image shift correcting lens system and the position of projection of the light image of the subject projected onto the image capturing surface of a CCD.

In a case where it is assumed that the electronic camera 1 is not provided with the image shift correcting lens system 15 as shown in FIG. 4(a), it is assumed that the light image of the subject is projected in a central position P1 of the image capturing surface of the CCD 27 when the taking lens system is situated in a central position shown by the arrow A. Moreover, when, in this case, the taking lens system is moved from the position A to the position B and the central position P1 of the image capturing surface of the CCD 27 are moved in the direction of the arrow with respect to the subject O due to a hand shake as shown in FIG. 4(b), the position of projection of the light image of the subject on the image capturing surface of the CCD 27 is, for example, P2, and at this time, the image is shifted by ΔL from that in the case of FIG. 4(a).

In the present embodiment, when the taking lens system and the CCD 27 are in the condition of FIG. 4(a) and the image shift correcting lens system 15 is situated in a central position (the position shown by the arrow C) as shown in FIG. 4(c),. the light image of the subject is directed to the central position P1 of the image capturing surface of the CCD 27, and when a hand shake occurs as shown in FIG. 4(d), the image shift correcting lens system 15 moved from the position C to the position D in response to the movement of the taking lens system from the position A to the position B is moved from the position D to the position F so that the light image of the subject is always directed to the position P1 on the image capturing surface of the CCD 27, thereby performing image shift correction.

Figure 5:
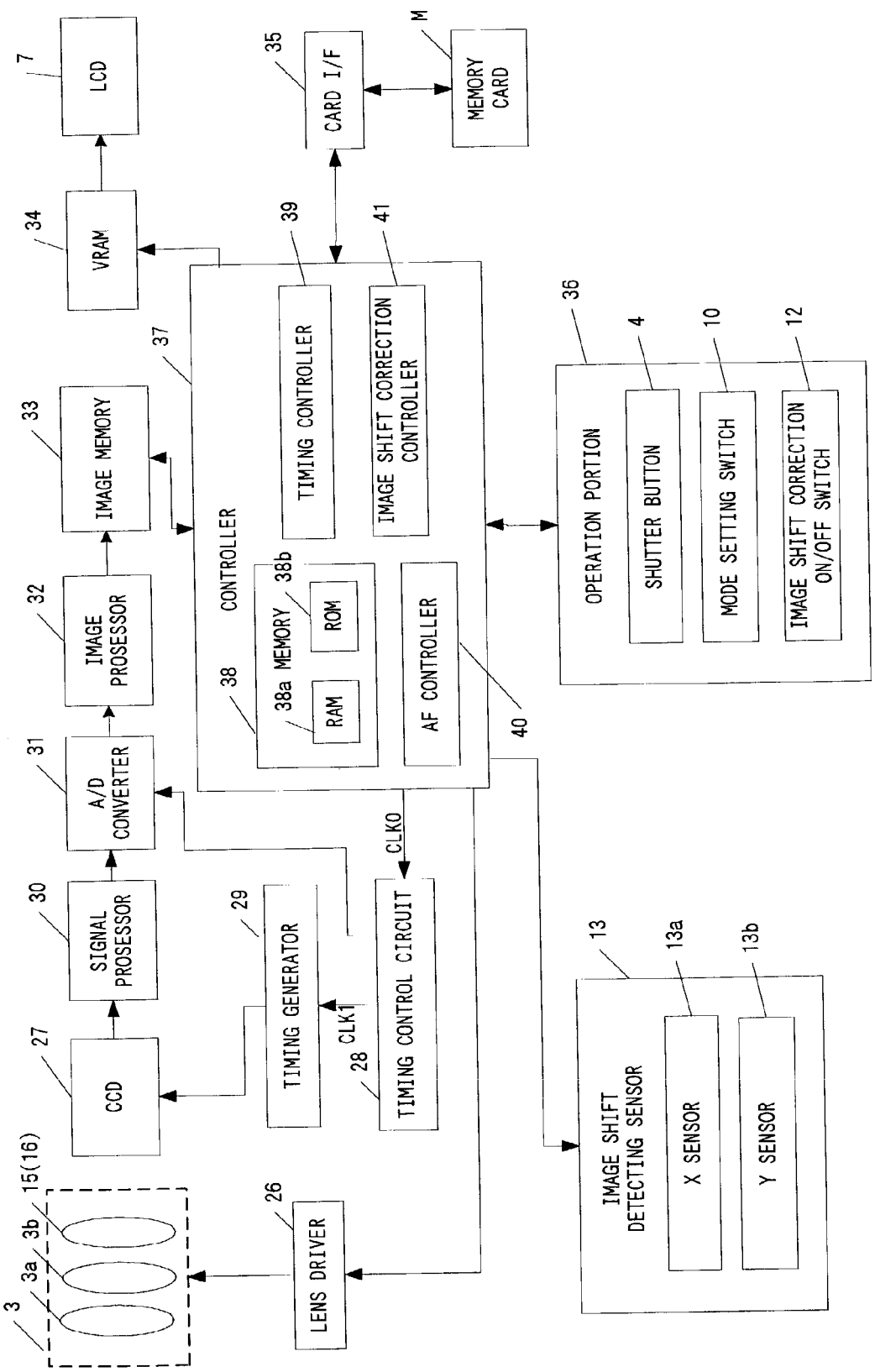
FIG. 5 is a block diagram of the electronic camera.

Next, the block structure of the electronic camera 1 will be described with reference to FIG. 5. The same elements as those of FIGS. 1 to 3 are denoted by the same reference numbers.

The lens driver 26 comprises a motor driving the zoom lens system 3a of the lens unit 3, a motor driving the focusing lens system 3b and a motor driving the image shift correcting lens systems 15 and 16. The image shift correcting lens systems 15 and 16 are driven so that the position of projection of the light image of the subject onto the image capturing surface of the CCD 27 at the start of image shift correction is fixed.

The CCD 27 is an image sensing element comprising a color area sensor having in rows and columns a plurality of pixels receiving color components of R (red), G (green) and B (blue), and photoelectrically converts the light image of the subject formed on the image capturing surface by the lens unit 3 into image signals of color components of R (red), G (green) and B (blue). In the present embodiment, as described later, an exposure operation by the CCD 27 and an operation to output pixel data generated by the exposure operation are alternately performed in a predetermined cycle, for example, in a cycle of 15 ms.

A timing control circuit 28 is controlled by an overall controller 37 described later. The timing control circuit 28 generates a clock CLK1 based on a reference clock CLK0, outputs the clock CLK1 to a timing generator 29, generates a clock CLK2 for A/D conversion based on the reference clock CLK0, and outputs the clock CLK2 to an A/D converter 31.

The timing generator 29 generates clock signals such as driving control signals for the CCD 27, for example, an exposure start/end (integration start/end) timing signal and signals to control readout of light receiving signals of the pixels (a synchronizing signal, a vertical synchronizing signal, a transfer signal, etc.) based on the reference clock CLK1 output from the timing control circuit 28.

A signal processor 30 performs predetermined analog signal processing on the image signal (analog signal) output from the CCD 27. In the present embodiment, the signal processor 30 reduces the noise of the image signal (analog signal) output from the CCD 27, and adjusts the level of the image signal.

The A/D converter 31 converts the pixel signals (analog signals) of the image data input from the signal processor 30 into digital signals of predetermined bits, for example, 10 bits based on the clock CLK2 output from the timing control circuit 28.

An image processor 32 performs processings such as black level correction of correcting the black level of the pixel signals A/D converted by the A/D converter 31 (hereinafter, referred to as pixel data) to a reference black level, white balance correction of performing level conversion of the pixel data of each of the color components of R (red), G (green) and B (blue) and gamma correction of correcting the gamma characteristic of the pixel data.

An image memory 33 temporarily stores the pixel data output from the image processor 32 in the photographing mode, and temporarily stores the image data read out from the memory card M in the playback mode.

A VRAM 34 is a buffer memory for the image data played back on the LCD 7, and has a memory capacity of the image data corresponding to the number of pixels of the LCD 7.

A card I/F 35 is an interface for writing and reading image data onto and from the memory card M.

In the digital camera 1, in a photographing standby state, the A/D converter 31 and the image processor 32 perform predetermined signal processings on each pixel data of images captured, for example, every 1/15 second by the CCD 27, and then, the pixel data is recorded into the image memory 33 and transferred to the VRAM 34 through the overall controller 37. The transferred pixel data is displayed on the LCD 7 in real time (electronic viewfinder function). This enables the user to visually confirm the subject image from the image displayed on the LCD 7. Moreover, in the digital camera 1, in the playback mode, the image data read out from the memory card M is recorded into the image memory 33, and after undergoing predetermined signal processing, the image data recorded in the image memory 33 is transferred to the VRAM 34 and played back on the LCD 7.

An operation portion 36 is for inputting operation information of the shutter button 4, the mode setting switch 10, the image shift correction ON/OFF button 12 and the like to the overall controller 37.

The overall controller 37 comprises a microcomputer, and organically controls the driving of the above-described members in the camera body 2 to thereby perform centralized control of the photographing operation of the electronic camera 1. A memory 38 comprises a RAM 38a for work of a CPU 42 and a ROM 38b storing programs of various kinds of functions that the electronic camera 1 is provided with.

A timing controller 39 generates a timing signal providing instructions to perform the exposure by the CCD 27, to read out the pixel signal, to perform the A/D conversion by the A/D converter 31, and to start or end the automatic focusing processing (referred to as AF processing) and the image shift correction operation.

An AF controller 40 performs, in response to an operation signal of the shutter button 4 (a detection signal by the switch S1 or a detection signal by the switch S2), AF processing according to the contrast detection method of locating the in-focus position by use of the contrast of each image data recorded in the image memory 33.

The AF processing according to the contrast detection method will be described.

Figure 6:
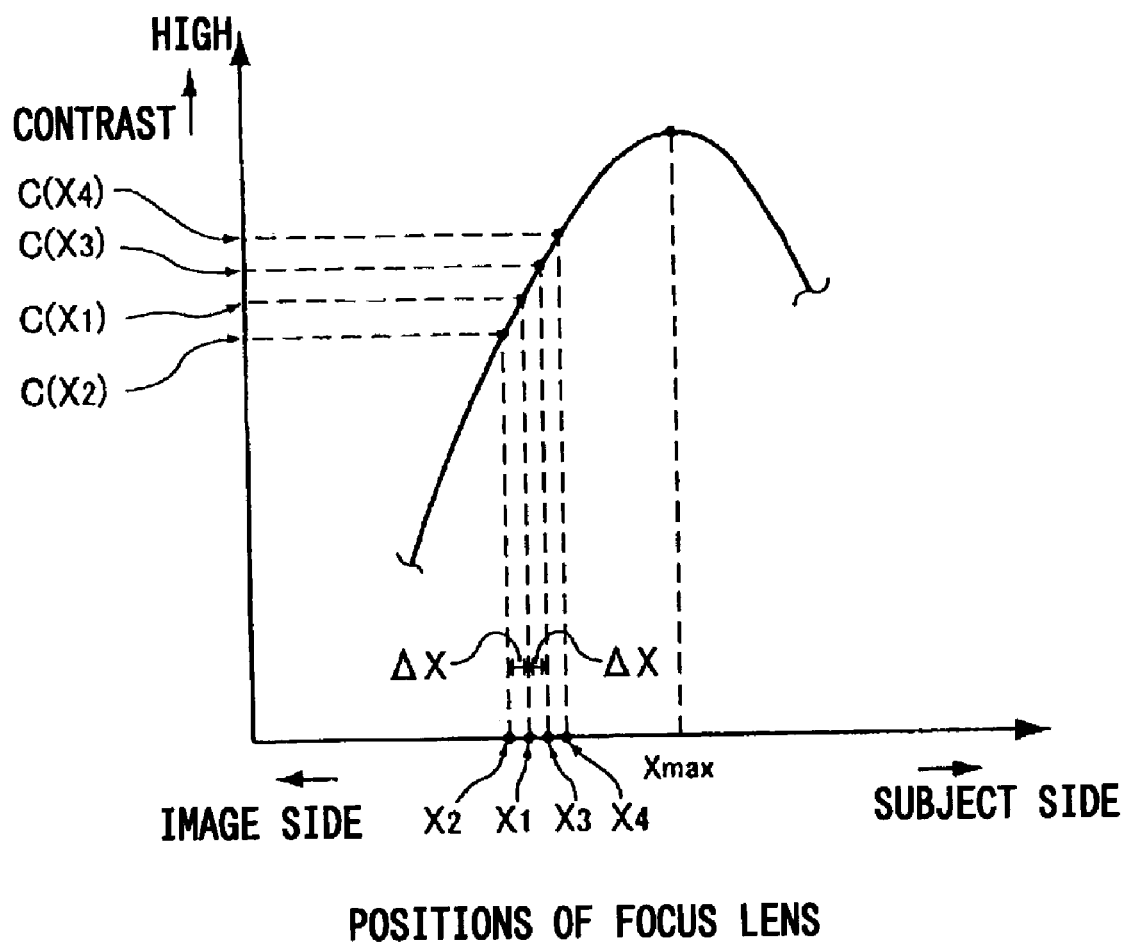
FIG. 6 is a view of assistance in explaining AF processing according to the contrast detection method.

FIG. 6 shows a relationship between the position of the focusing lens system 3b in the direction of the optical axis and the contrast of the subject. As shown in FIG. 6, the waveform of the contrast of the image with respect to the position of the focusing lens system 3b generally has a curve such that when the focusing lens system 3b is situated in a certain position, the contrast is highest, that is, the taken image is sharpest and as the focusing lens system 3b moves from the position toward the image side or the subject side in the direction of the optical axis, the contrast of the taken image decreases. FIG. 6 indicates that in photographing a subject with the electronic camera 1, the contrast is highest when the focusing lens system 3b is situated in the position Xmax.

In the AF processing of the electronic camera 1 according to the present embodiment, in FIG. 6, assuming that the focusing lens system 3b is situated in the position X1 in the direction of the optical axis (hereinafter, referred to as reference position X1) immediately after the electronic camera 1 is turned on, when the shutter button 4 is half depressed under this condition, a subject image is captured at the reference position X1, and the contrast C(X1) is calculated by use of the image data. Then, the focusing lens system 3b is moved by a preset movement amount Δx, for example, toward the image side, a subject image is captured at the position X2, and the contrast C(X2) is calculated by use of the image data. At this time, since C(X1)>C(X2) as is apparent from FIG. 6, determining that the contrast does not increase even if the focusing lens system 3b is moved from the position X1 toward the image side, the focusing lens system 3b is moved from the position X2 by a movement amount 2Δx toward the subject M side (from the reference position X1 by the movement amount Δx toward the subject M side).

Then, a subject image is captured at the position X3, and the contrast C(X3) is calculated by use of the image data. At this time, since the relationship between the intensities of the contrasts (C(1) and C(3) at the positions X1 and X3 is (C(1)<C(3) as is apparent from FIG. 6, determining that the contrast increases if the focusing lens system 3b is moved from the position X1 toward the subject side, the focusing lens system 3b is further moved from the position X3 by the movement amount Δx toward the subject M side (position X4).

Then, a subject image is captured at the position X4, and the contrast C(4) is calculated by use of the image data. At this time, since the relationship between the intensities of the contrasts C(3) and C(4) at the positions X3 and X4 is C(3)<C(4) as is apparent from FIG. 6, the focusing lens system 3b is moved from the position X4 by the movement amount Δx toward the subject M side.

The contrast evaluation is repeated in a similar manner, the contrast C(Xn) at the position Xn calculated in the n-th evaluation is compared with the contrast C(Xn+1) at the position Xn+1 calculated in the (n+1)-th evaluation, and when C(Xn+1)<C(Xn), the focusing lens system 3b is fixed with the position Xn as the in-focus position. With this, the AF processing is completed. When C(Xn+1)=C(Xn), determining that the highest value of the contrast is present between the position Xn and the position Xn+1, the focusing lens system 3b is set, for example, midway between the position Xn and the position Xn+1.

As described above, in the present embodiment, since the AF processing is performed by use of the image contrast, if a hand shake occurs during the execution of the AF processing, the images captured during the AF processing are shifted from each other, so that high-frequency components of the image data disappear and, for example, the gradient of the wavelength of the image contrast shown in FIG. 6 decreases. Since this decreases the difference between the contrasts of the two images to be compared with each other, it is difficult to locate the position Xmax where the contrast is highest. Consequently, when the shutter button 4 is fully depressed, the exposure to the CCD 27 is not started immediately, so that a right moment to take a picture is missed or photographing is performed at a wrong focusing lens position. Therefore, in the present embodiment, image shift correction is performed during the execution of the AF processing in the photographing preparation period not only in the image shift correcting mode but also in the image shift non-correcting mode.

Returning to FIG. 5, a image shift correction controller 41 calculates the direction and the amount of image shift based on a image shift detection signal from the image shift detecting sensor 13, and controls the driving of the image shift correcting lens systems 15 and 16 based on the calculated direction and amount of image shift. The image shift correction controller 41 allows image shift correction to be performed only during the AF processing in the photographing preparation processing in the image shift non-correcting mode. In the image shift correcting mode, the image shift correction controller 41 allows image shift correction to be always performed in the photographing preparation period and at the time of photographing.

Figure 7:
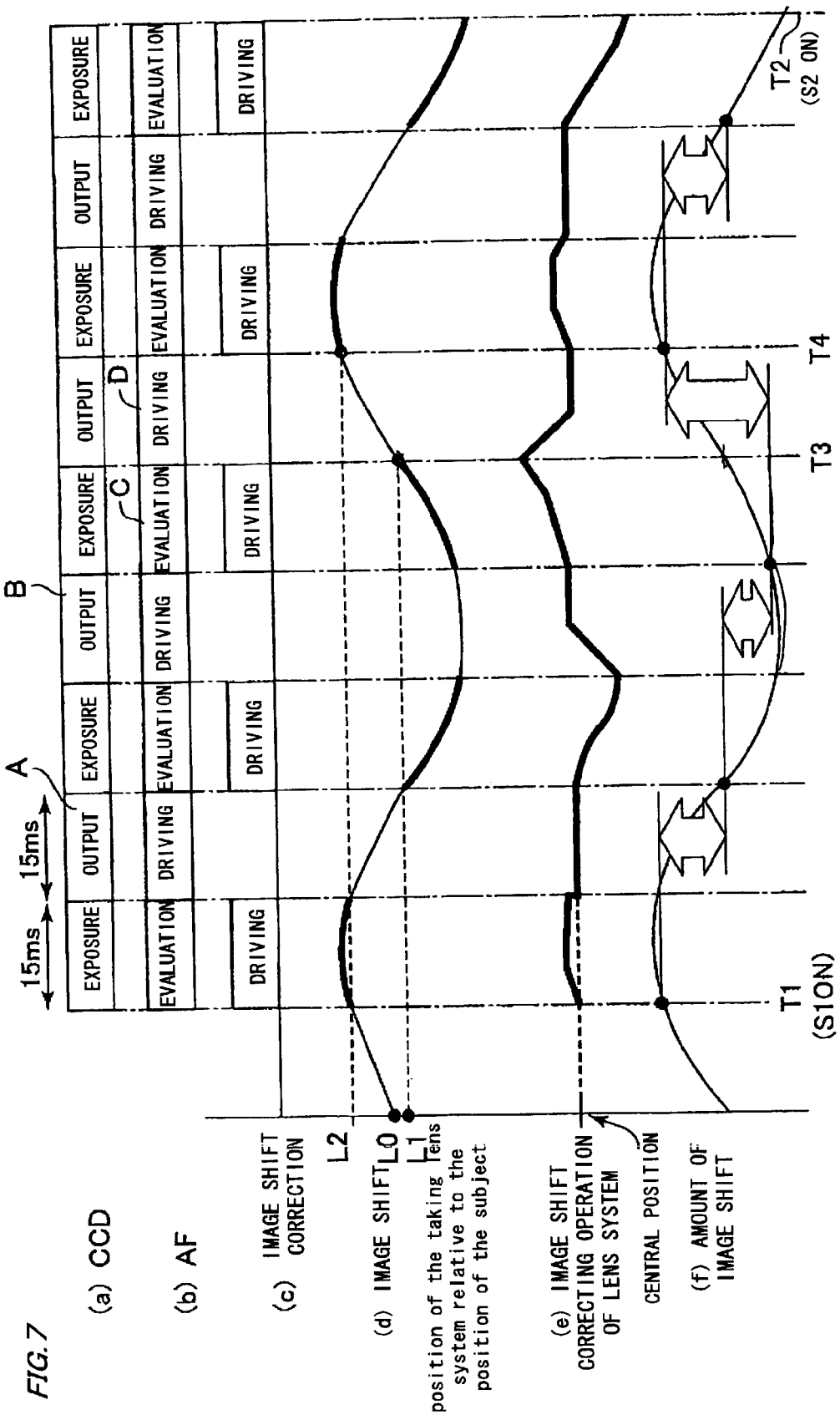
FIG. 7 is a time chart showing operations (exposure and pixel data output) by the CCD, the AF processing and the image shift correction processing in the photographing preparation period in the image shift non-correcting mode.

FIG. 7 is a time chart showing operations (exposure and pixel data output) by the CCD 27, the AF control by the AF controller 40 and the image shift correction control by the image shift correction controller 41 in the photographing preparation period from the time of a half depression of the shutter button 4 (time T1) to the time of a full depression thereof (time T2) in the image shift non-correcting mode.

As shown in FIG. 7, during the photographing preparation period from the time T1 to the time T2, the exposure operation and the pixel data output operation by the CCD 27 are alternately performed in a cycle of 15 ms as mentioned above in order to capture image data used for the photographing preparation processing such as the AF processing.

In the AF processing, the driving of the focusing lens system 3b and the evaluation of the image contrast are performed in a cycle of 15 ms in synchronism with the operations by the CCD 27. That is, in the time chart shown in FIG. 7, the contrast evaluation is synchronized with the exposure operation by the CCD 27, and the driving of the focusing. lens system 3b is synchronized with the pixel data output operation by the CCD 27. For example, in the contrast evaluation period C, the contrast of the pixel data output from the CCD 27 in the output period A is compared with that of the pixel data output in the output period B, and in the driving period D, the focusing lens system 3b is driven based on the result of the evaluation (the direction and the distance of movement of the focusing lens system 3b).

It has been described that image shift correction is performed during the execution of the AF processing in the photographing preparation period because, if a hand shake occurs in the exposure periods when the driving of the CCD 27 and the AF control are performed as described above, the images captured in the exposure periods are shifted from each other and this makes it impossible to accurately perform the contrast evaluation and the driving of the focusing lens system. With the aim of preventing erroneous recognition of the mode while performing appropriate AF processing, image shift correction is performed only in the exposure periods in the AF processing.

That is, as shown in (d) of FIG. 7, when it is assumed that a hand shake (in other words, a change of the position of the taking lens system relative to the position of the subject) of a substantially sinusoidal waveform occurs in the direction of the X axis in the photographing preparation period, the image shift detection signal is captured from the image shift detection sensor 13a only in the exposure periods of the CCD 27 as shown in (c), and the image shift correcting lens system 15 is driven in accordance with the hand shake occurring in the exposure periods. In (d) of FIG. 7, the position L0 is the position of the taking lens system relative to the position of the subject when there is no handshake.

In the pixel data output period, the image shift correcting lens system 15 is reset to a central position which is the initial position (position where no image shift correction is performed).

Why image shift correction is performed only in the exposure periods of the CCD 27 and no image shift correction is performed and the image shift correcting lens system 15 is reset to the central position in the pixel data output periods as described above will be described in the following:

According to the present embodiment, since the image shift correcting lens system 15 is not allowed to perform image shift correction in the pixel data output periods (in the present embodiment, the image shift correcting lens system 15 is reset to the central position), the positional relationship between the taking lens system and the image shift correcting lens system 15 differs between at the time of start of the current image shift correction and at the time of end of the previous image shift correction.

For example, in the time chart of FIG. 7, paying attention to the times T3 and T4, it is assumed that the taking lens system and the image shift correcting lens system 15 are situated in the positions (positions B and D) shown by the solid lines in FIG. 4(d) at the time T3. Then, in the pixel data output period between the time T3 and the time T4, for example as shown in FIG. 4(e), the image shift correcting lens system 15 is reset from the position D to the central position C and the taking lens system is moved, for example, from the position B (corresponding to L1 in FIG. 7) to the position E (corresponding to L2 in FIG. 7). When it is assumed that the taking lens system is situated in the position E of (e) of FIG. 7 at the time of start of the next exposure (time T4), at this time, the light image of the subject is projected onto the position P3 different from the position P1. In the exposure period of the CCD 27 started at the time T4, the light image of the subject is always projected onto the position P3 of the image capturing surface because of image shift correction.

As described above, since the position of projection of the light image of the subject O is determined by the positional relationship between the taking lens system and the image shift correcting lens system 15 and the image shift correction according to the present embodiment makes fixed the position of projection of the light image of the subject onto the image capturing surface of the CCD 27 at the time of start of image shift correction, the images captured by the CCD 27 in the exposure periods are determined by the positional relationship between the taking lens system and the image shift correcting lens system 15 at the start of the exposure.

Therefore, by performing image shift correction only in the exposure periods of the CCD 27 and not performing it in the pixel data output periods, in the periods of exposure by the CCD 27 performed before and after the pixel data output periods, the position of the image shift correcting lens system 15 relative to the position of the taking lens system is changed and the position of projection of the light image of the subject is changed, so that the images captured in the exposure periods are shifted from one another.

With this, the live view image displayed on the LCD 7 is blurred, so that the user recognizes the occurrence of a hand shake by visually confirming the blurred image.

Moreover, in the present embodiment, since the positions of the image shift correcting lens system 15 at the time of start of image shift correction in the exposure periods are the same (the central position, or non-correction position), the shift amount is determined in accordance with the position of the taking lens system relative to the position of the subject at the time of start of image shift correction, and as shown in (f) of FIG. 7, the amounts of shifts between the images displayed on the LCD 7 correspond to the sizes of the arrows.

By performing image shift correction in the AF processing in the photographing preparation period even in the image shift non-correcting mode as described above, accurate AF processing can be performed. Moreover, since a blurred image can be displayed on the LCD 7 as described above by performing image shift correction only in the exposure periods of the CCD 27 in the AF processing period, the problem is solved that the user erroneously thinks that the image shift correcting mode is set although the image shift non-correcting mode is set in actuality or that although recognizing that the image shift non-correcting mode is set, the user erroneously recognizes that no hand shake occurs although a hand shake occurs in actuality.

In the present embodiment, a collision between the image shift correcting lens system 15 and the lens holder 14 is prevented as much as possible by resetting the image shift correcting lens system 15 to the central position in every period during which no image shift correction is performed (the pixel data output period), so that it can be prevented as much as possible that image shift correction is unexecutable because of the collision.

Figure 8:
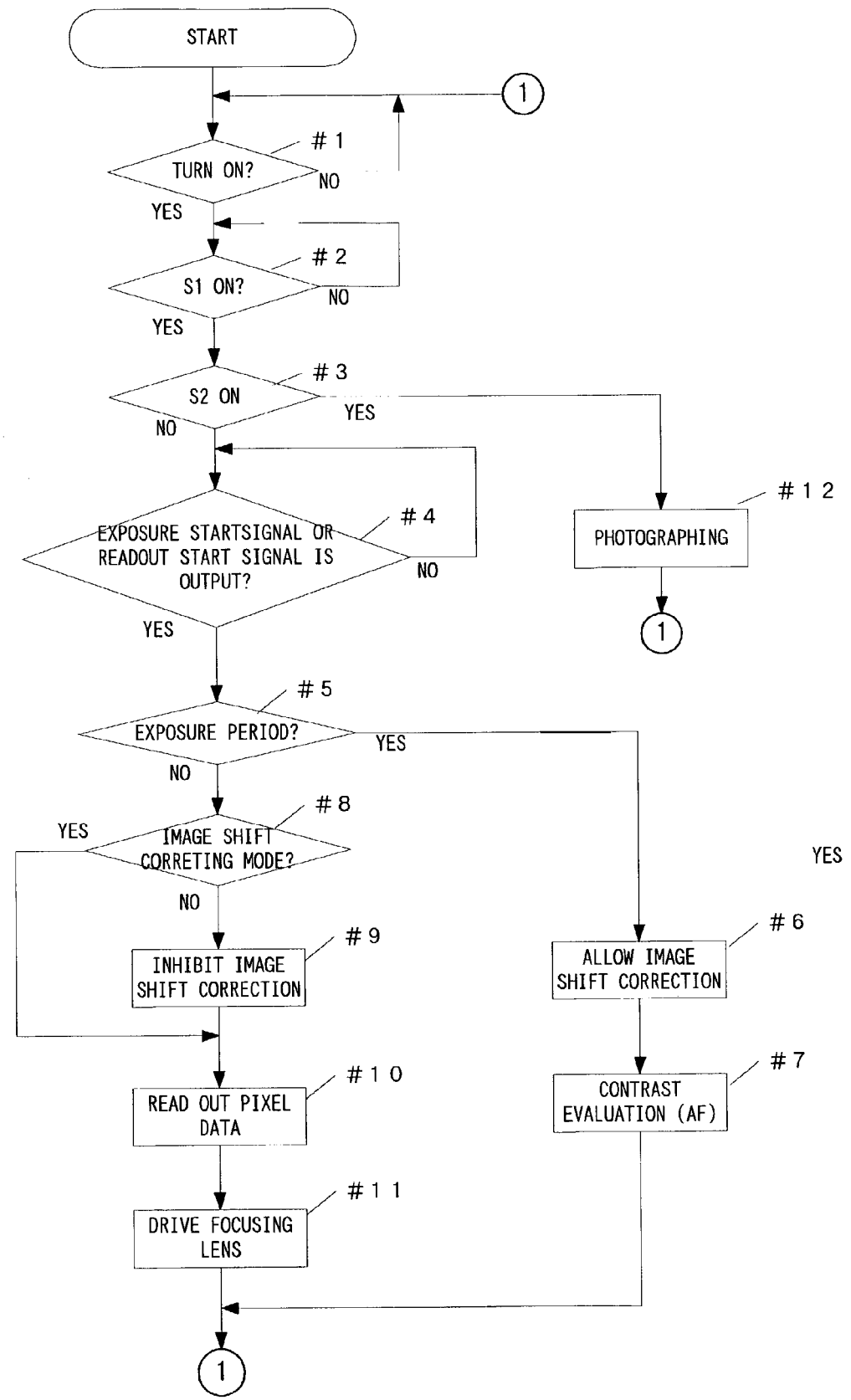
FIG. 8 is a flowchart showing the procedure of the photographing preparation processing and the photographing processing according to the present embodiment.

FIG. 8 is a flowchart showing the procedure of the photographing preparation processing and the photographing processing of the electronic camera 1 according to the present embodiment.

As shown in FIG. 8, after the electronic camera 1 is turned on (YES at step #1), the processings at steps #4 to #11 are repeated from the time the shutter button 4 is half depressed (YES at step #2) to the time it is fully depressed (NO at step #3).

After the processing at step #3, it is determined whether or not an exposure start signal indicating the start of the exposure by the CCD 27 or a readout start signal indicating the readout of the pixel data from the CCD 27 is output (step #4), and when either of the signals is output (YES at step #4), it is determined whether it is an exposure period of the CCD 27 or not (step #5). When it is an exposure period of the CCD 27 (YES at step #5), in order that AF processing is performed by use of the contrast of an image with no blur (or little blur), image shift correction is performed, the execution of the image shift correction is allowed (step #6), and the contrast evaluation is performed (step #7). Then, the process returns to step #1.

On the other hand, when it is not an exposure period of the CCD 27 (No at step #5), that is, when it is a pixel data output period, it is determined whether the image shift correcting mode is set or not (step #8). When the image shift non-correcting mode is set (NO at step #8), image shift correction is inhibited (step #9) and the processing at step #10 is performed. When the image shift correcting mode is set (YES at step #8), the processing at step #9 is skipped and the processing at step #10 is performed.

After the processing at step #8 or step #9, pixel data is read out from the CCD 27 (step #10). Then, after the driving of the focusing lens system 3b is performed in accordance with the result of the evaluation at step #6 (step #11), the process returns to step #1.

Then, when the shutter button 4 is fully depressed at step #3 (YES at step #3), a subject image is captured by the CCD 27, and after the data of the image is recorded onto the memory card M (step # 12), the process returns to step #1.

Figure 9:
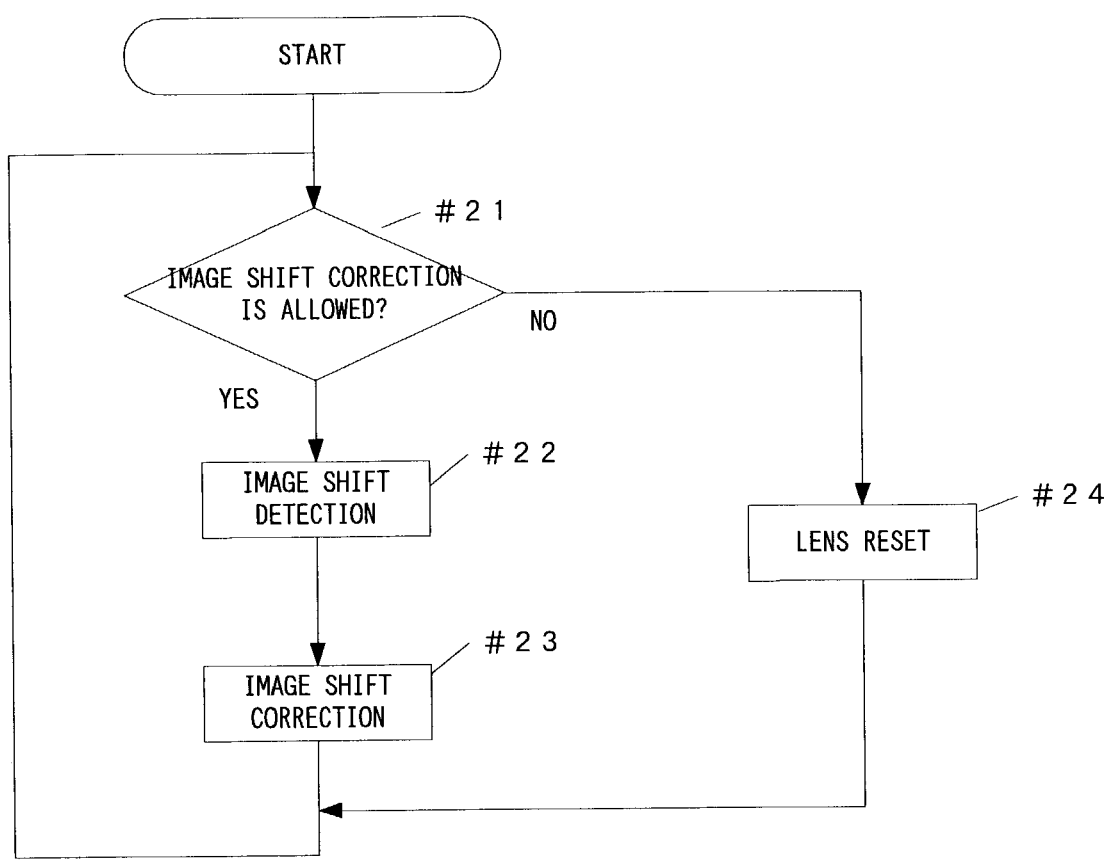
FIG. 9 is a flowchart showing the procedure of the image shift correction processing performed in the photographing preparation period.

FIG. 9 is a flowchart showing the procedure of the image shift correction processing performed in the photographing preparation period.

As shown in FIG. 9, when image shift correction is allowed (YES at step #21), a hand shake is detected by the image shift correcting mechanism (step #22), and image shift correction is performed (step #23). Then, the process returns to step #21. When image shift correction is inhibited (NO at step #21), the image shift correcting lens system 15 is reset to the central position in order that a blurred image is displayed on the LCD 7 (step #24). Then, the process returns to step #21.

As described above, since image shift correction is performed only in the exposure periods of the CCD 27 during the execution of the AF processing in the photographing preparation period even in the image shift non-correcting mode, a blurred image can be displayed. on the LCD 7 even when image shift correction is performed in the exposure periods of the CCD 27 during the execution of the AF processing in the photographing preparation period in the image shift non-correcting mode. By doing this, the user can be prevented from erroneously recognizing that the image shift non-correcting mode is not set although the image shift non-correcting mode is set in actuality while precise AF processing is performed in the photographing preparation period.

Figure 10:
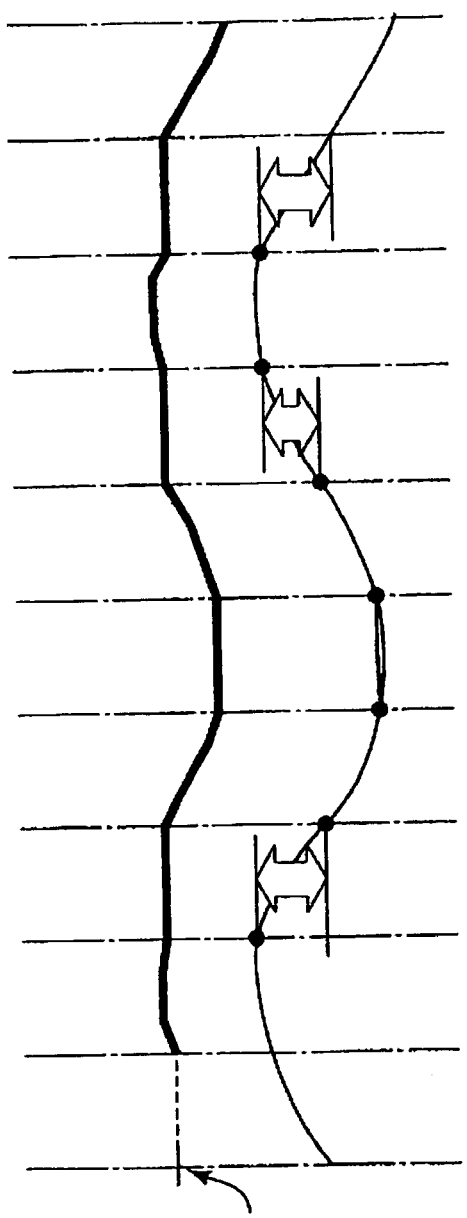
FIG. 10 is a time chart of another embodiment of the present invention.

The present invention is not limited to the above-described embodiment but the following modifications (1) to (3) may be adopted:

(1) While in the above-described embodiment, the image shift correcting lens system 15 is reset, to the central position (non-correction position) when the pixel data output processing is started, the present invention is not limited thereto. The image shift correcting lens system 15 may be stopped at the end of each exposure period as shown in (e') of FIG. 10. In that case, the image shift correcting lens system 15 is driven from the stopped position in the next exposure period to perform image shift correction. By doing this, power consumption can be reduced compared to the above-described embodiment as the image shift correcting lens system 15 is not reset to the central position. In this case, since the positional relationship between the taking lens system and the image shift correcting lens system 15 at the start of the exposure by the CCD 27 is different from that in the above-described embodiment, the image shift amount is different from that in the above-described embodiment. That is, the image shift amount corresponds to the amount of shift between the position of the taking lens system at the end of the previous exposure and the position of the taking lens system at the start of the current exposure as shown in (f) of FIG. 10. Consequently, the shift amount can be made small.

(2) While in the above-described embodiment, image shift correction is performed only in the exposure periods of the CCD 27, the present invention is not limited thereto. Image shift correction may be always performed until the AF processing is finished irrespective of the operations (exposure and pixel data output) by the CCD 27.

Figure 11:
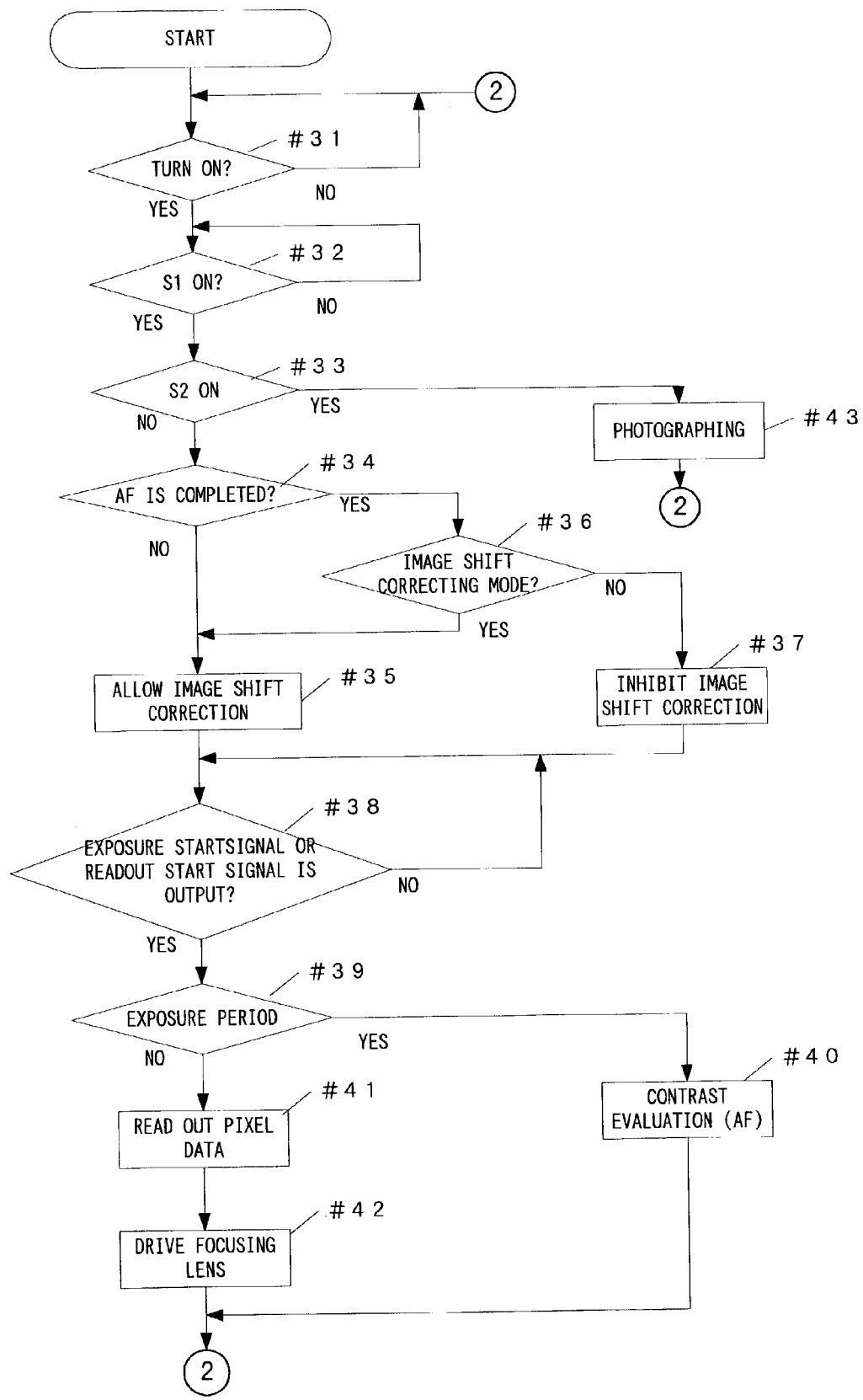
FIG. 11 is a flowchart of another embodiment of the present invention.

That is, as shown in FIG. 11, after the electronic camera 1 is turned on (YES at step #31), the processings at steps #34 to #42 are repeated from the time the shutter button 4 is half depressed (YES at step #32) to the time it is fully depressed (NO at step #33).

That is, after the processing at step #33, it is determined whether the AF processing is completed or not (step #34), and when the AF processing is not completed (NO at step #34), image shift correction is performed irrespective of whether in the image shift correcting mode or in the image shift non-correcting mode (step #35). When the AF processing is completed (YES at step #34), image shift correction is performed (step #35) in the image shift correcting mode (YES at step #36), and image shift correction is inhibited (step #37) in the image shift non-correcting mode (NO at step #36).

Then, it is determined whether or not the exposure start signal indicating the start of the exposure by the CCD 27 or the readout start signal indicating the readout of the pixel data from the CCD 27 is output (step #38), and when either of the signals is output (YES at step #38), it is determined whether it is an exposure period of the CCD 27 or not (step #39). When it is an exposure period of the CCD 27 (YES at step #39), in order that AF processing is performed by use of the contrast of an image with no blur (or little blur), image shift correction is performed, and the contrast evaluation is performed (step #40). Then, the process returns to step #31.

When it is not an exposure period of the CCD 27 (NO at step #39), that is, when it is a pixel data output period, pixel data is read out from the CCD 27 (step #41), and the focusing lens system 3b is driven (step #42). Then, the process returns to step #31.

Then, when the shutter button 4 is fully depressed at step #33 (YES at step #33), the photographing processing is performed (step #43).

As described above, accurate AF processing can be performed in the photographing preparation period also by always performing image shift correction in the AF processing period in the photographing preparation period in the image shift non-correcting mode.

(3) While in the above-described embodiment, the image shift correcting lens system 15 is provided and image shift correction is performed by use of the lens system 15, image shift correction may be performed, for example, by driving the CCD 27 in the X and the Y directions without the provision of the image shift correcting lens system 15.

Figure 12:
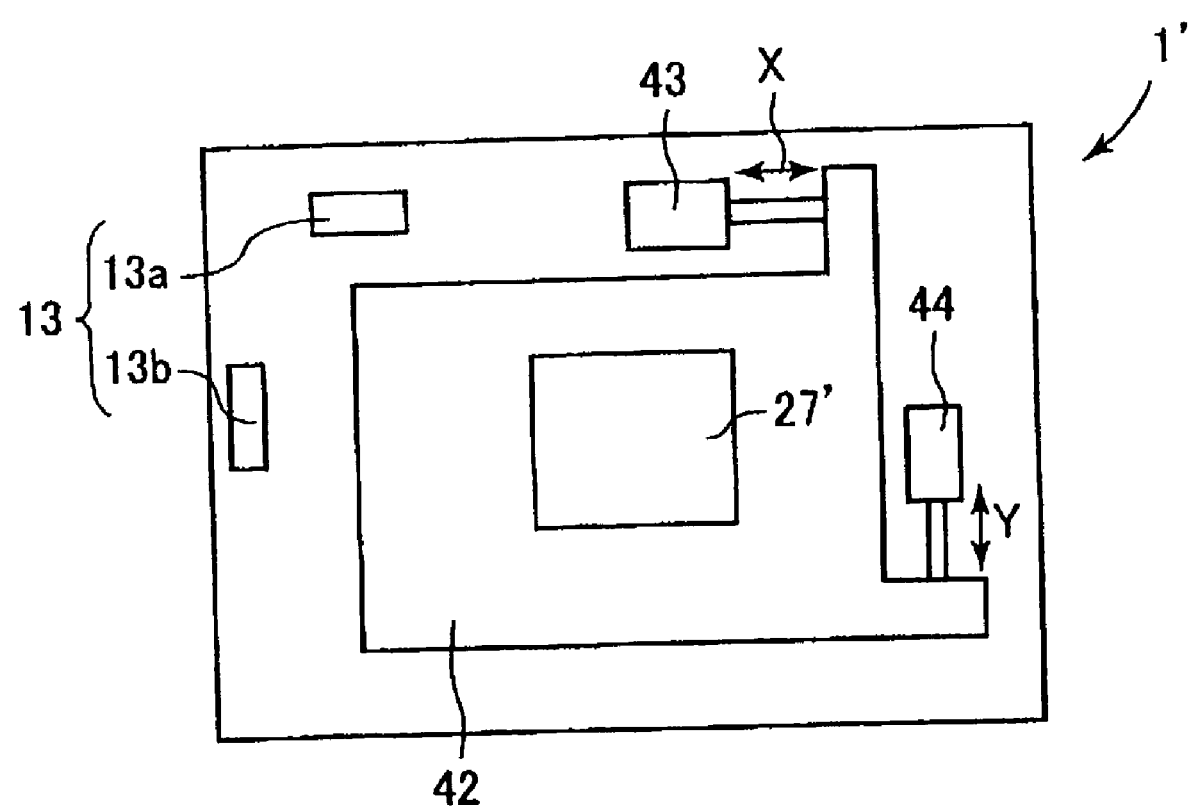
FIG. 12 is a front view showing the structure of another embodiment of the electronic camera according to the present invention.

That is, the present invention is applicable to structures optically correcting a shift, due to a hand shake, of a light image of the subject projected onto the image capturing surface of the CCD such as a structure such that as shown in FIG. 12, a CCD 27' is held, a table 42 for parallelization in two directions perpendicular to each other (the X and the Y directions) within the image forming surface of the taking lens system, and an X actuator 43 and a Y actuator 44 for parallelly moving the table 42 in the X and the Y directions are provided, and image shift correction is performed while the position of projection of the light image of the subject with respect to the image capturing surface of the CCD 27' is fixed by moving the CCD 27' by the X actuator 43 and the Y actuator 44 in accordance with the result of the detection by the image shift detecting sensor 13.

As described above, according to the present invention, since image shift correction is performed only in the exposure operation in the photographing preparation period, during the exposure operation, the position of projection of the light image of the subject onto the image capturing surface of the image capturing means is fixed and appropriate focusing can be performed, whereas in the period in which the exposure operation by the image capturing means is not performed, the position of projection of the light image of the subject onto the image capturing surface of the image capturing means is changed by a hand shake and the images captured by the exposure in the exposure periods, further the images successively displayed on the displaying means are shifted from each other, so that the user can recognize the occurrence of a hand shake.

Moreover, according to the present invention, since the image shift correcting means is optically returned to the non-correction position between the periodic exposure operations in the photographing preparation period, the image shift correcting means can be restrained from reaching a structural limit position.

Moreover, according to the present invention, since image shift correction is performed only in the period in which the focusing operation is completed, power consumption can be reduced as image shift correction is not performed after the completion of the focusing operation.

Although the present invention has been fully described in connection with the preferred embodiments thereof with reference to the accompanying drawings, it is to be noted that various changes and modifications are apparent to those skilled in the art. Such changes and modifications are to be understood as included with in the scope of the present invention as defined by the appended claims unless they depart therefrom.

What is claimed is:

1. An image capturing device, comprising:
   an image capturing element for performing image capture;
   a taking lens system directing a subject image to the image capturing element;
   an exposure controlling element for performing an exposure for obtaining image data for focusing and an exposure for obtaining image data for recording in the image capturing element;
   a focusing element for performing focusing of the taking lens system based on the image data for focusing;
   an image shift correcting element for correcting a shift of a subject image in the image capturing element;
   an instructing element for providing an instruction to start photographing for recording, and
   a controlling element for performing the correction by the image shift correcting element during a photographing preparation period when the exposure for obtaining image data for focusing is performed, and not when outputting the image data for focusing from the image capturing element is performed, the photographing preparation period being from a beginning of the exposure for obtaining the image data for focusing to providing the instruction from the instructing element and including a repetition of a period for the exposure and a period for the outputting of the image data.

2. An image capturing device according to claim 1, further comprising:
   a setting element for setting whether to perform image shift correction or not in image capture for recording,
   wherein the controlling element performs image shift correction both in the exposure for obtaining image data for focusing and in the exposure for obtaining image data for recording when it is set that image shift correction is performed, or performs image shift correction only in the exposure for obtaining image data for focusing when it is set that image shift correction is not performed.

3. An image capturing device according to claim 1, wherein the image shift correcting element optically corrects a shift of a light image of the subject in the image capturing element, and the controlling element optically returns the image shift correcting element to a non-correction position except for the exposure for obtaining image data for focusing.

4. An image capturing device according to claim 1, wherein the controlling element allows the correction operation by the image shift correcting element to be performed until the focusing operation by the focusing element is completed.

5. An image capturing device according to claim 1, wherein the image shift correcting element optically corrects a shift of a light image of the subject in the image capturing element, and the controlling element optically stops the image shift correcting element at the end of the exposure for obtaining image data for focusing.

6. An electric camera projecting an image of a subject onto an image capturing surface of image capturing element through a taking lens system capable of focusing, and capturing the image, comprising:

an instructing element for providing an instruction to start photographing for recording;

a displaying element for performing monitoring display of captured image data;

a focusing element for focusing the taking lens system based on image data of the subject, the image data being captured by the image capturing element in repeating an exposure period and an output period in a predetermined cycle during a photographing preparation period, the photographing preparation period being a period from a beginning of the exposure period to providing the instruction from the instructing element;

an image shift correcting element for optically correcting a shift, due to a hand shake, of a light image of the subject projected onto the image capturing surface; and a controlling element for allowing the correction operation by the image shift correcting element only during the exposure period in the photographing preparation period and not during the output period in the photographing preparation period.

7. An electric camera according to claim 6, wherein the controlling element optically returns the image shift correcting element to a non-correction position in the output period in the photographing preparation period.

8. An electric camera according to claim 6, wherein the controlling element allows the correction operation by the image shift correcting element to be performed until the focusing operation by the focusing element is completed.

9. An electric camera comprising:

an image capturing element for performing image capture;

a taking lens system directing a subject image to the image capturing element;

an instructing element for providing an instruction to start photographing for recording;

a displaying element for performing monitoring display of captured image data;

a focusing element for focusing the taking lens system based on image data of the subject, the image data being captured by the image capturing element in repeating an exposure period and an output period in a predetermined cycle during a photographing preparation period, the photographing preparation period being a period from a beginning of the exposure period to providing the instruction to start photographing;

an image shift correcting element for optically correcting a shift, due to a hand shake, of a light image of the subject projected onto the image capturing surface;

a mode switching element for selectively switching between an image shift correcting mode in which image shift correction is performed at the time of photographing and an image shift non-correcting mode in which image shift correction is inhibited at the time of photographing; and a controlling element for allowing the image shift correction to be performed in both the exposure period and the output period during the photographing preparation period and at the time of photographing when the image shift correcting mode is selected, and for allowing image shift correction to be performed only in the exposure period in the photographing preparation period, and not during the output period in the photographing preparation period when the image shift non-correcting mode is selected.

10. An electric camera according to claim 9, wherein the controlling element does not perform image shift correction during the output period of the photographing preparation period when the image shift non-correcting mode is selected.

* * * * *